(12) United States Patent
Romero-Mariona et al.

(10) Patent No.: US 9,531,689 B1
(45) Date of Patent: Dec. 27, 2016

(54) SYSTEM AND METHOD FOR ENCRYPTION OF NETWORK DATA

(71) Applicant: The United States of America as represented by the Secretary of the Navy, Washington, DC (US)

(72) Inventors: Jose Romero-Mariona, San Diego, CA (US); Tom Nguyen, San Diego, CA (US); Mihail Schoolov, San Diego, CA (US); Ashton Mozano, San Diego, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/597,349

(22) Filed: Jan. 15, 2015

Related U.S. Application Data (60) Provisional application No. 62/077,477, filed on Nov. 10, 2014.

(51) Int. Cl.
*H04L 29/06* (2006.01)
*G06F 21/60* (2013.01)

(52) U.S. Cl.
CPC ......... *H04L 63/0471* (2013.01); *G06F 21/602* (2013.01); *H04L 63/0428* (2013.01); *H04L 63/0464* (2013.01); *H04L 63/062* (2013.01)

(58) Field of Classification Search
CPC ............. H04L 63/0464; H04L 63/0471; H04L 63/9428
USPC .............................................. 713/150; 726/1
See application file for complete search history.

(56) References Cited

U.S. PATENT DOCUMENTS

| | | | |
|---|---|---|---|
| 8,024,560 B1* | 9/2011 | Alten | H04L 63/0428 713/156 |
| 8,055,895 B2 | 11/2011 | Buer et al. | |
| 9,009,858 B2* | 4/2015 | Sapp, II | G06F 21/62 380/30 |
| 2003/0172280 A1* | 9/2003 | Scheidt | H04L 63/0442 713/182 |
| 2004/0022390 A1* | 2/2004 | McDonald | H04L 9/083 380/277 |
| 2008/0082837 A1* | 4/2008 | Mattsson | G06F 21/6209 713/193 |
| 2008/0130490 A1* | 6/2008 | Yu | H04L 12/4633 370/223 |

(Continued)

*Primary Examiner* — Kambiz Zand
*Assistant Examiner* — Tongoc Tran
(74) *Attorney, Agent, or Firm* — Spawar Systems Center Pacific; Kyle Eppele; Ryan J. Friedl (57) ABSTRACT

A system and method involve determining that one or more data packets received from a first device on a communications network are one of data at rest and data in transit, performing one of an encryption operation and a decryption operation on the data packets, and storing the data packets in a memory device if they are data at rest or transmitting the data packets over the communications network if they are data in transit. If the data packets are data in transit, the method may involve, prior to transmission, encapsulating information into a frame of the data packets to indicate they are data in transit. The data packets may be compressed prior to encryption. The determination that the data packets are one of data at rest and data in transit may be based upon a value of at least one data field of the data packets.

19 Claims, 7 Drawing Sheets

(56) References Cited

U.S. PATENT DOCUMENTS

| | | | | |
|---|---|---|---|---|
| 2008/0196082 A1* | 8/2008 | Sandoval | ............. | H04L 63/102 |
| | | | | 726/1 |
| 2008/0291827 A1* | 11/2008 | Xiong | ................... | H04L 45/00 |
| | | | | 370/230.1 |
| 2010/0142616 A1* | 6/2010 | Hegde | ............... | H04N 21/6437 |
| | | | | 375/240.15 |
| 2010/0332401 A1* | 12/2010 | Prahlad | .............. | G06F 17/3002 |
| | | | | 705/80 |
| 2012/0201381 A1* | 8/2012 | Miller | ....................... | H04L 9/16 |
| | | | | 380/255 |
| 2014/0013452 A1* | 1/2014 | Aissi | ................... | G06F 21/604 |
| | | | | 726/30 |
| 2014/0068706 A1* | 3/2014 | Aissi | ................. | G06F 21/6254 |
| | | | | 726/1 |
| 2014/0331279 A1* | 11/2014 | Aissi | ...................... | G06F 21/53 |
| | | | | 726/1 |

\* cited by examiner

SYSTEM AND METHOD FOR ENCRYPTION OF NETWORK DATA

FEDERALLY SPONSORED RESEARCH AND DEVELOPMENT

The System and Method for Encryption of Network Data is assigned to the United States Government. Licensing inquiries may be directed to Office of Research and Technical Applications, Space and Naval Warfare Systems Center, Pacific, Code 72120, San Diego, Calif. 92152; telephone (619) 553-5118; email: ssc_pac_t2@navy.mil. Reference Navy Case No. 102291.

CROSS-REFERENCE TO RELATED APPLICATIONS

This application claims the benefit of U.S. Provisional Patent Application Ser. No. 62/077,477 filed Nov. 10, 2014, entitled "System and Method for Encryption of Network Data", the content of which is fully incorporated by reference herein.

BACKGROUND

Existing common practices for handling classified data-at rest and data-in-transit within unmanned platforms are often inefficient and costly both in terms of time and resources, resulting in intelligence analysis that is based on stale, disjoint, and incomplete data. The billions of bits of information that are collected each day from various unmanned and autonomous sensors and platforms around the world can contain highly sensitive data that, if intercepted and processed by an adversary, could significantly compromise strategic capabilities. Existing cryptographic solutions within conventional network environments are often not suitable for the majority of smaller unmanned platforms due to size, weight, and power consumption requirements, as well as risks associated with reverse-engineering controlled cryptographic items.

A system and method are needed that can encrypt/decrypt both network data at rest and network data in transit, while having a small form factor to enable, for example, integration into smaller unmanned vehicles.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The embodiments disclosed herein describe a system and method for data encryption and decryption that is suitable, as an example, for use on unmanned and autonomous systems. Focuses of the system and method include minimizing power consumption and form factor, while maximizing data throughput, and encrypting both data-in-transit (DIT) (i.e. data to be transmitted) and data-at-rest (DAR) (i.e. data to be stored).

Figure 1:
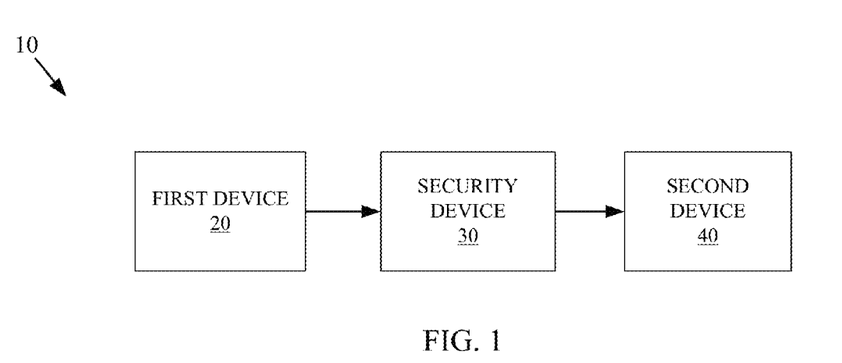
FIG. 1 shows a diagram illustrating an embodiment of a system in accordance with the System and Method for Encryption of Network Data.

FIG. 1 shows a diagram illustrating an embodiment of a system 10 in accordance with the System and Method for Encryption of Network Data. System 10 includes a first device 20, a security device 30, and a second device 40. As an example, first device 20 is a client device, such as a sensor collecting data, and second device 40 is a server device, such as a host in a data center collecting data from the sensor. As another example, first device 20 is an Unmanned Aerial Vehicle (UAV) collecting data (i.e. pictures/images/videos) and second device 40 is the control center where the UAV transmits the data it collected.

In some embodiments, first device 20, security device 30, and second device 40 are connected over a network, such as any known communication network. In some embodiments, the communication between security device 30, first device 20, and second device 40 is through multicast UDP socket connection. In some embodiments the security device 30 is embedded in a space vehicle where satellite data is processed to the second device 40 at the ground station through satellite and radio networks. In some embodiments, first device 20, security device 30, and second device 40 work as a relay to provide support to other types of devices without direct connection to source data and/or home station commands.

Figure 2:
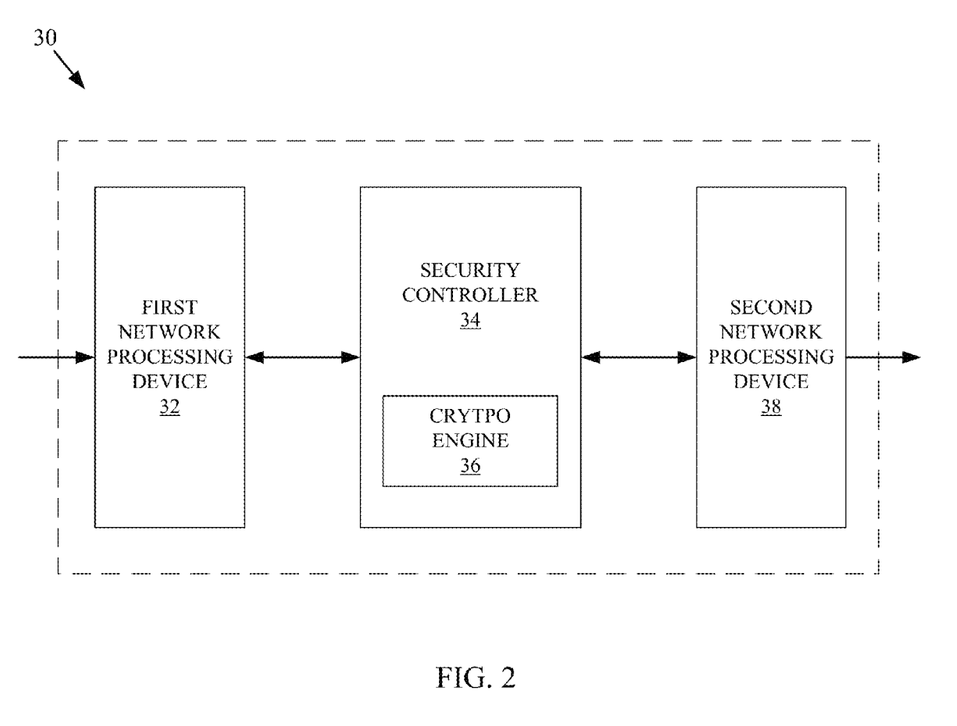
FIG. 2 shows a diagram illustrating an embodiment of a security device for use with a system in accordance with the System and Method for Encryption of Network Data.

FIG. 2 shows a diagram illustrating an embodiment of security device 30 shown in FIG. 1. Security device 30 includes a first network processing device 32, a security controller 34 with a crypto engine 36, and a second network processing device 38. In some embodiments, first network processing device 32 is a "plain-text" network processing and second network processing device 38 is for "cipher-text" network processing. As used herein, "plain-text" refers to readable data, which is unencrypted/unprotected, and "cipher-text" refers to unreadable data which is encrypted.

As an example, security controller 34 may be based on the Xilinx Zynq-7000 platform, which integrates a dual-core mobile processor, such as a 32-bit processor developed by ARM Holdings, with an FPGA in a single chip. The processor may be used for processing, while the FPGA's programmable logic may house crypto engine 36. In some embodiments, security controller 34 is configured to access a security database and route data packets based on certain fields of the data packet. As an example, the security database may be located in the internal memory of the ARM processor or SDRAM. In some embodiments, security controller 34 is also configured to store the data locally/internally or send it through an encrypted network tunnel. Crypto engine 36 is configured to encrypt and decrypt incoming data as well as outgoing data. As an example, crypto engine 36 may comprise NSA-approved software algorithms used for encryption and decryption purposes.

In operation, information arrives as data packets on the network from first device 20 into first network processing device 32. To protect the data, each packet may be encapsulated and sent through a secured tunnel on second network processing device 38 out to the network to second device 40. Device configuration settings, which can be preset by a user of the system, will determine whether the data is stored on a local storage device for DAR or forward to an external host on the network for a DIT solution. Many currently-available network encryption devices only address the DAR portion by performing encryption and subsequently routing the packets over the network.

Figure 3:
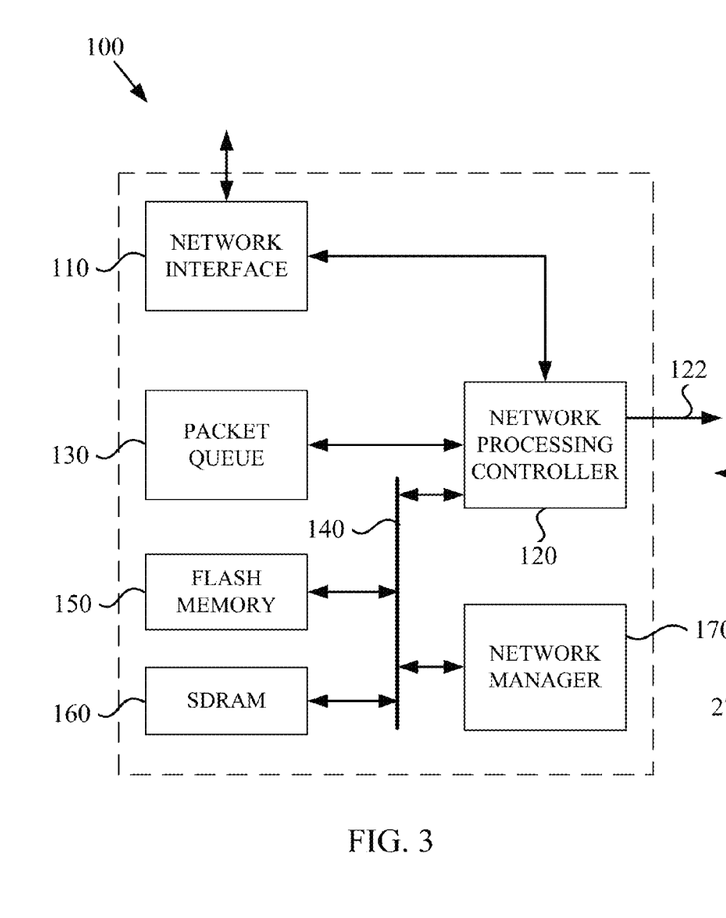
FIGS. 3 and 4 show diagrams illustrating embodiments of network processing devices for use with a system in accordance with the System and Method for Encryption of Network Data.

FIG. 3 shows a diagram illustrating an embodiment of a first network processing device 100 for use with a system in accordance with the System and Method for Encryption of Network Data. As an example, first network processing device 100 may be used for first network processing device 32 shown in FIG. 2. Device 100 includes a network interface 110, a network processing controller 120, a packet queue 130, a bus 140, a flash memory 150, SDRAM 160, and a network manager 170. As an example, network interface 110 may comprise an Ethernet interface with dedicated direct memory access (DMA) and IEEE 1588 support, packet queue 130 may comprise internal data buffers of the network processor volatile memory, and network manager 170 may comprise an internal processor which interfaces with network processing controller 120 to manage the flow of data of first network processing device 100.

Network interface 110 sends and receives data packets over a network, such as the Internet, an Ethernet, a wide area network, a local area network, or any other wired or wireless network. Network interface 110 may receive data packets from first device 20. The data packets received are processed by network processing controller 120, which outputs the processed data packets 122 to security controller 34. Data packets that are waiting for processing by network processing controller 120 is stored in data packet queue 130. As part of the processing of the data packets, network processing controller 120 communicates, via bus 140, with flash memory 150, SDRAM 160, and network manager 170. As an example, network manager 170 is configured to manage the flow of data of first network processing device 100.

Figure 4:
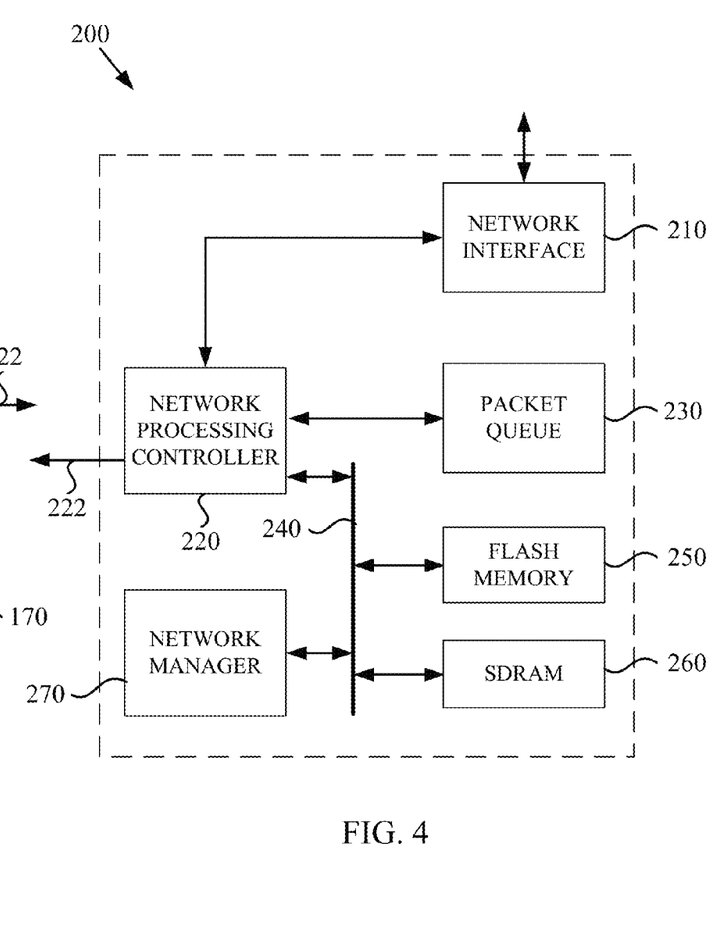

FIG. 4 shows a diagram illustrating an embodiment of a second network processing device 200 for use with a system in accordance with the System and Method for Encryption of Network Data. As an example, second network processing device 200 may be used for second network processing device 38 shown in FIG. 2. Device 200 includes a network interface 210, a network processing controller 220, a packet queue 230, a bus 240, a flash memory 250, SDRAM 260, and a network manager 270. Components of device 200 and components of device 100 having the same name may be configured the same.

Network interface 210 sends and receives data packets over a network, such as the Internet, an Ethernet, a wide area network, a local area network, or any other wired or wireless network. The data packets received are processed by network processing controller 220, which outputs the processed data packets 222 to security controller 34. Data packets that are waiting for processing by network processing controller 220 is stored in data packet queue 230. As part of the processing of the data packets, network processing controller 220 communicates, via bus 240, with flash memory 250, SDRAM 260, and network manager 270. As an example, network manager 270 is configured to manage the flow of data of second network processing device 200.

Figure 5:
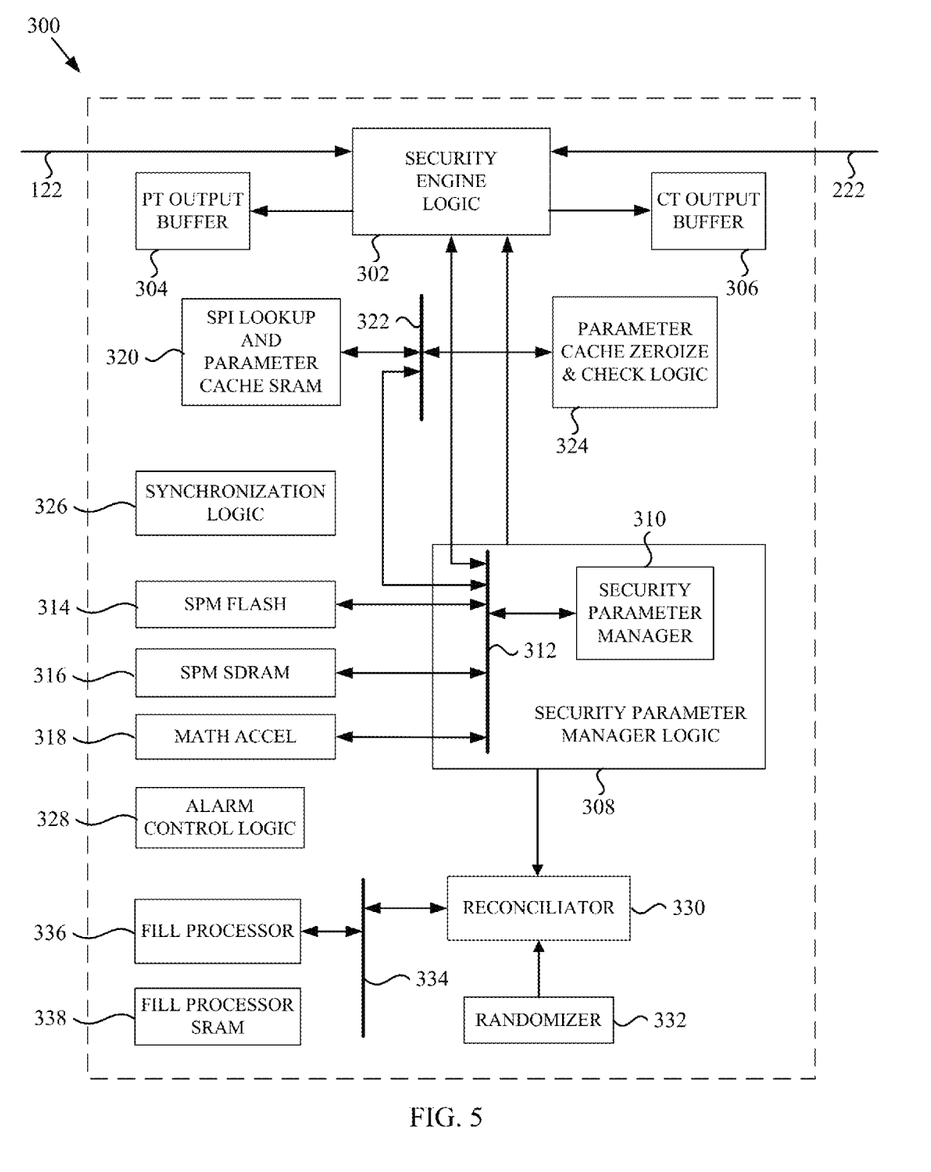
FIG. 5 shows a diagram illustrating an embodiment of a security controller for use with a system in accordance with the System and Method for Encryption of Network Data.

FIG. 5 shows a diagram illustrating an embodiment of a security controller 300 for use with a system in accordance with the System and Method for Encryption of Network Data. As an example, security controller 300 is a custom controller programmed to manage the encryption and decryption of data packets and may be used for security controller 34 shown in FIG. 2. Security controller 300 may include security engine 302, which receives data packets 122 from first network processing device 32 or 100 and data packets 222 from second network processing device 38 or 200. As an example, security engine 302 may comprise a custom software module programmed to process encrypted cypher-text and unencrypted plain-text data. A plain-text buffer 304 and a cypher-text buffer 306 are used to store data packets that cannot immediately be processed. Buffers 304 and 306 may comprise of encrypted cypher-text and unencrypted plain-text data destined to the first and second networking processing devices, 32 and 38 respectively, as shown in FIG. 2.

Controller 300 includes security parameter manager logic 308, which includes security parameter manager 310. Security parameter manager logic 308 may comprise custom software modules programmed determine how to process and encapsulate data packets. Security parameter manager 310 interfaces, via bus 312, with SPM flash 314, SPM SDRAM 316, and math acceleration logic 318. Security parameter manager 310 also interfaces, via bus 322, with SPI lookup and parameter cache SRAM 320 and parameter cache zeroize and check logic 324. Security parameter manager 310 may comprise custom software modules programmed to interface with security parameter manager logic 308 and access the necessary information to process and encapsulate data packets. Controller 300 also includes synchronization logic 326, which is configured to maintain and control the flow of data to and from security controller 300. Controller 300 further includes alarm control logic 328, which is configured generate alert for transmission from security controller 300.

Security parameter manager logic 308 is further configured to interface with reconciliator 330, which receives input from randomizer 332. Reconciliator 330 is configured to generate unique key information used by the security controller 300 to encrypt and decrypt data packets. Reconciliator 330 interfaces, via bus 334, with fill processor 336 and fill processor SRAM 338. Fill processor 336 is configured to process encryption/decryption key parameters used by security parameter manager 310.

In some embodiments, real-time cryptographic acceleration is embedded in controller 300. This cryptographic accelerator provides a set of hardware acceleration for the advanced cryptographic algorithms usually needed to provide confidentiality, authentication, data integrity and non-repudiation when exchanging messages with a peer. As an example, the algorithm is based on Cipher Block Chaining (CBC) with 128-bit key.

Figure 6:
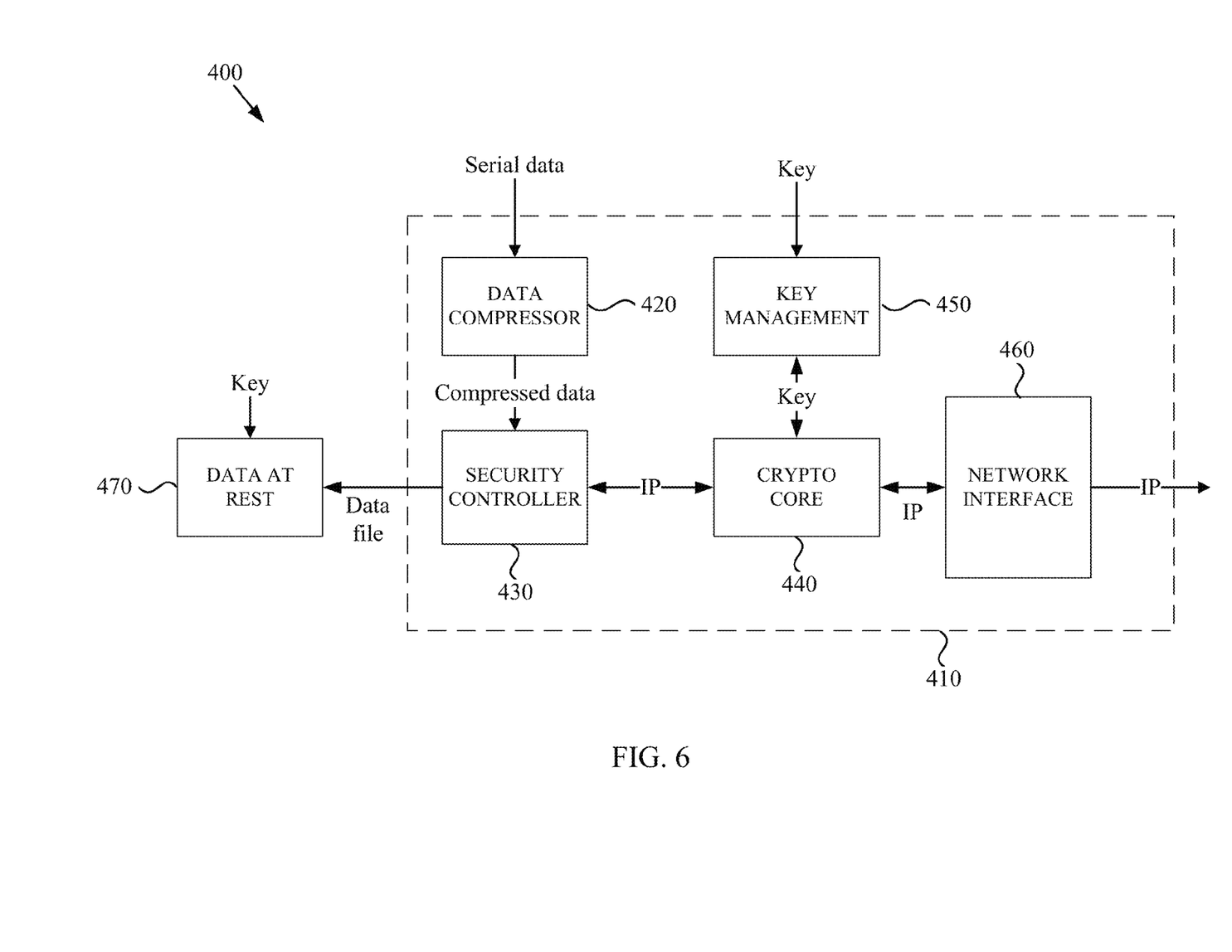
FIG. 6 shows a diagram illustrating an embodiment of a method for data and key processing in accordance with the System and Method for Encryption of Network Data.

FIG. 6 shows a diagram 400 illustrating an embodiment of the major components for the data and key processing in accordance with the System and Method for Encryption of Network Data. Diagram 400 shows the data in transit component, which is displayed in block 410 and the data at rest component, which is displayed in box 470. Within block 410, incoming serial data packets are compressed by data compressor 420. The compressed data is then passed to security controller 430, which processes the compressed data packets and outputs the data packets to box 470 if it is determined to be data-at-rest. Security controller 430 interfaces with crypto core 440, which receives the encryption key via the key management box 450. No data stored on an encrypted volume can be encrypted or read (decrypted) without using the correct encryption key. Crypto core 440 also interfaces with a network interface 460, which is configured to transmit the encrypted data packets over a network if the incoming data is determined to be data-in-transit.

Figure 7:
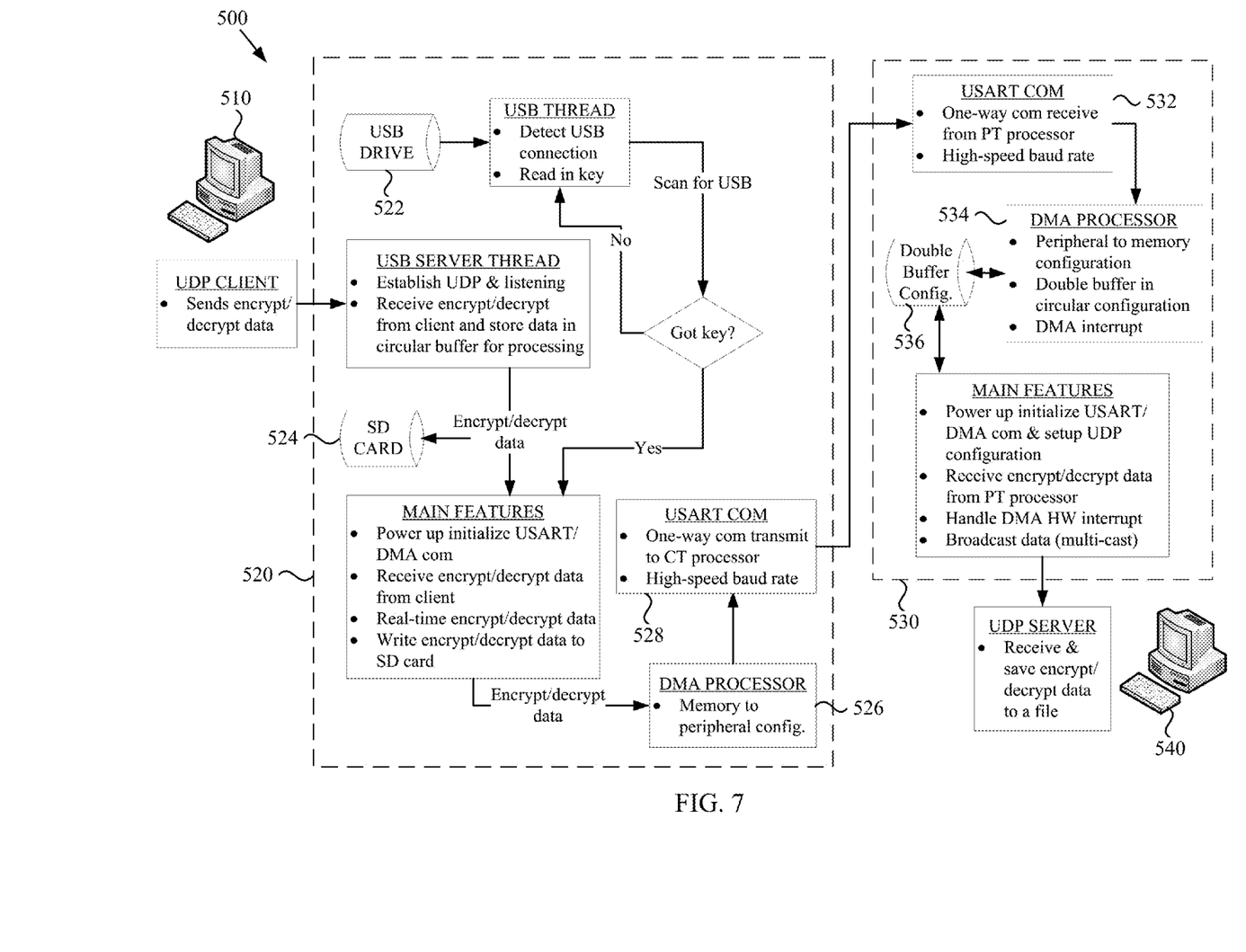
FIG. 7 shows a diagram illustrating an embodiment of a method for client/server processing in accordance with the System and Method for Encryption of Network Data.

FIG. 7 shows a diagram illustrating an embodiment of a method 500 for client/server processing in accordance with the System and Method for Encryption of Network Data. Method 500 may begin with a client 510, such as a UDP client, sending data packets to client security device 520 (similar to security device 30 described in FIG. 1) for encryption/decryption. As an example, a USB server thread may be used to establish, for example, UDP and listening, as well as receive the data packets for encryption/decryption from client 510 and store the data packets in a circular buffer for processing. Client security device 520 may include a USB drive 522 to load the encryption keys. A USB thread is configured to detect a USB connection and read in the encryption key. Client security device 520 is configured to determine that the USB is present and then to determine if the key is present. If not, client security device 520 waits until the key is detected and read-in. If so, the data packets are encrypted/decrypted.

Client security device 520 is used to power up and initialize communications device 528, receive the data packets for encryption/decryption, encrypt/decrypt the data packets in real-time, and write the encrypted/decrypted data packets to an SD card 524. The encrypted/decrypted data packets are then forwarded to DMA processor 526, which is configured in a memory-to-peripheral configuration.

As an example, DMA processor 526, as well as DMA processor 534, has 8 data streams and is capable of managing memory-to memory, peripheral-to-memory and memory-to-peripheral transfers. Adding a dedicated First-In-First-Out (FIFO) stream for Advanced High-performance Bus (AHB) & Advanced Peripheral Bus (APB) peripherals, provides the capability of handling data burst transfer with maximum bandwidth (~10.5 Mbits/sec). In addition, two DMA processors, such as processors 526 and 534, can support circular buffer management, which automates the use and switching of two memory buffers without requiring any special code. As an example, an implemented circular buffer for the first network processing device 32 side to handle FIFO stream from the second network processing device 38 side).

The data packets are then sent to communications device 528, which is a one-way communication to the cypher-text processor and has a high-speed baud rate. Data packets are received at server security device 530 over the network into the communications device 532. As an example, communications devices 528 and 532 are High speed Universal Synchronous/Asynchronous Receiver Transmitters (USART). These can run on dual-wire at speeds of up to 10.5 Mbit/s. Each provides hardware management of the CTS (Clear to Send) and RTS (Ready To Send) signals. In addition, DMA processors 526 and 534 can serve communications devices 528 and 532.

The data packets are then processed by DMA processor 534. As an example, DMA processor 534 is configured in a peripheral to memory configuration. DMA processor 534 is interfaced with memory 536 in a double buffer in circular configuration. The main features of server security device 530 are to power up and initialize USART communications port and setup the UDP configuration, receive the data packets to be encrypted/decrypted from client security device 520, handle DMA HW interrupt, and broadcast data. Server security device 530 is configured to broadcast data over a network to a server 540, such as a UDP server or a data center.

Figure 8:
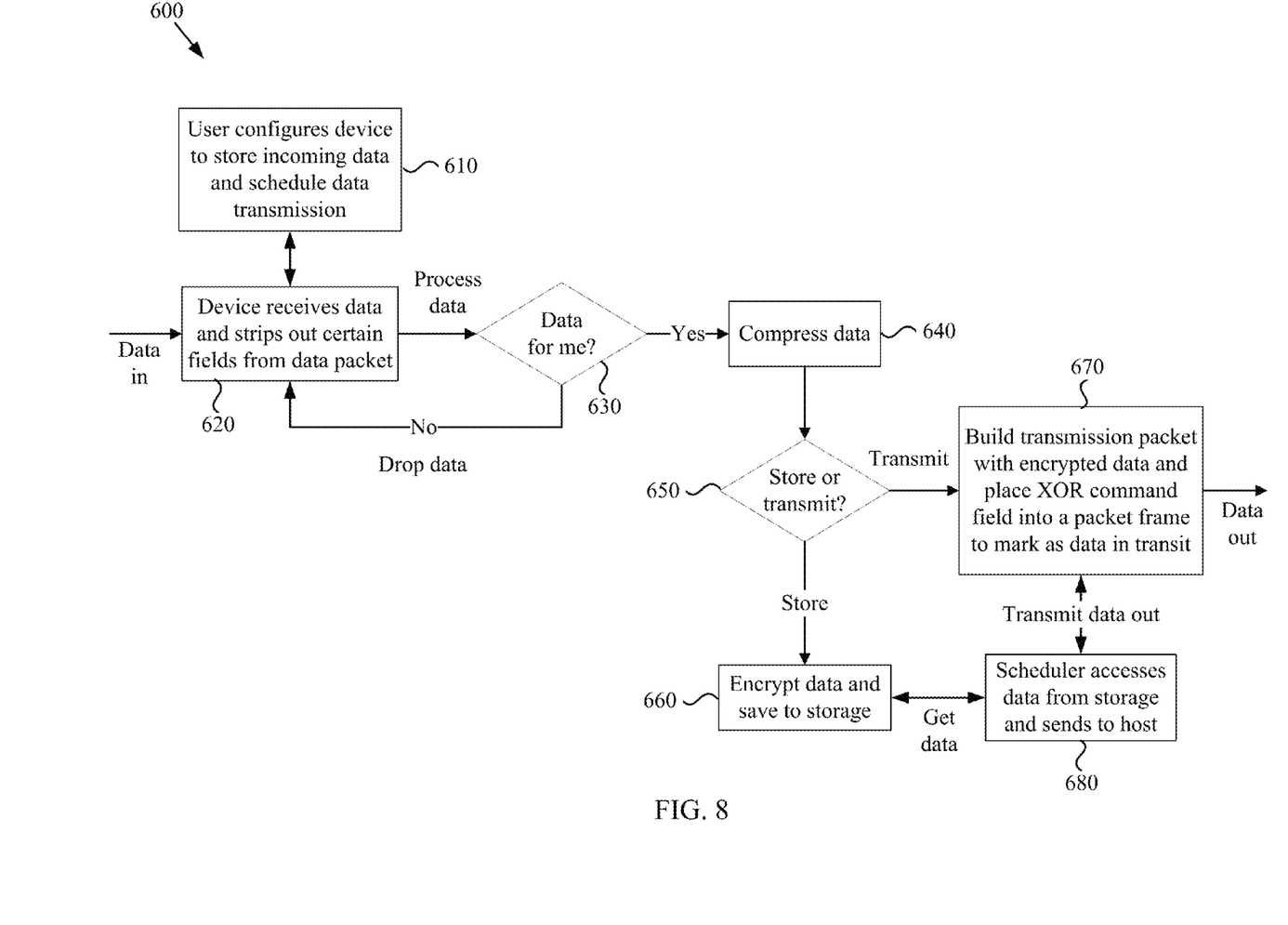
FIG. 8 shows a flowchart of an embodiment of a method in accordance with the System and Method for Encryption of Network Data.

FIG. 8 shows a flowchart of an embodiment of a method 600 in accordance with the System and Method for Encryption of Network Data. Method 600 begins at step 610, where a user configures the device to store incoming data packets and schedule data packet transmission. Step 620 involves the device receiving data packets and stripping out certain fields from the data packets. As an example, if the data packets are internet protocol (IP) packets, the data field is a differentiated services (DS) field in an IP header. The data packets are then processed and step 630 involves examining the destination address to make a determination whether or not the data packets are intended for that particular device. If not, then the data is dropped and flow is back to step 620 to receive data. If the data is for the device, the data is compressed at step 640.

Step 650 then involves a determination whether or not the data is data to be stored (i.e. data at rest) or data to be transmitted (i.e. data in transit). If the data is data to be stored, step 660 involves encrypting the data and saving to a storage device. If the data is to be transmitted, step 670 involves building a transmission packet with encrypted data and placing an XOR command field into a packet frame to mark the data as data in transit. The data is then transmitted out. If data in storage is to be transmitted out, step 680 involves a scheduler accessing data from the data storage and sending the previously stored data to the host to be transmitted.

Figure 9:
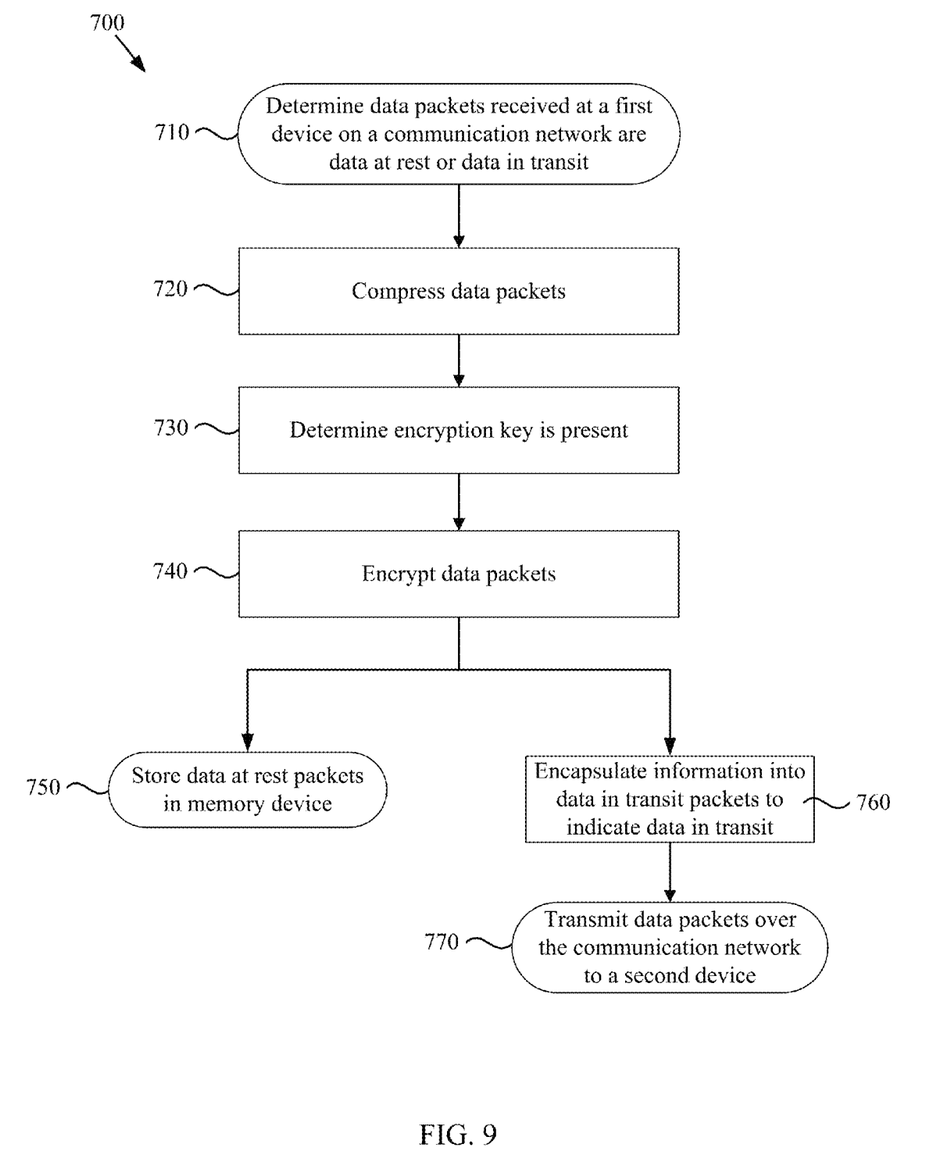
FIG. 9 shows a flowchart of an embodiment of a method in accordance with the System and Method for Encryption of Network Data.

FIG. 9 shows a flowchart of an embodiment of another method 700 in accordance with the System and Method for Encryption of Network Data. Method 700 disclosed herein may be implemented as a series of modules, either functioning alone or in concert with physical electronic and computer hardware devices. Such modules may be utilized separately and/or together locally and/or remotely to form a program product thereof, that may be implemented through recordable media. Method 700 may be implemented as a program product comprised of a plurality of such modules.

Some or all of the steps of method 700 may be stored on a non-transitory computer readable storage medium, wherein the steps are represented by computer-readable programming code. The steps of method 700 may also be computer-implemented using a programmable device, such as a computer-based system. Method 700 may comprise instructions that, when loaded into a computer-based system, cause the system to execute the steps of method 700. Method 700 may be computer-implemented using various programming languages, such as "Java", "C", or "C++". In some embodiments, method 700 may be implemented via an FPGA device. Further, method 700 may be implemented within a system such as system 10 shown in FIG. 1, using components shown in FIGS. 2-5.

For illustrative purposes, method 700 will be discussed with reference to the steps being performed by security device 30. Additionally, while FIG. 9 shows one embodiment of method 700 to include steps 710-770, other embodiments of method 700 may contain fewer or more steps. Further, while in some embodiments the steps of method 700 may be performed as shown in FIG. 9, in other embodiments the steps may be performed in a different order, or certain steps may occur simultaneously with one or more other steps.

Method 700 begins at step 710, which involves determining that one or more data packets received from a first device 20 on a communications network are one of data at rest and data in transit. In some embodiments, the step of determining that the data packets are one of data at rest and data in transit is based upon a value of at least one data field of the data packets. As an example, the data packets are internet protocol (IP) packets and the data field is a differentiated services (DS) field in an IP header. In this example, the value of the data field may be the DS code point value.

Step 720 involves compressing the data packets. As an example, the data packets may be compressed using a compression module such as zip or gzip. Step 730 involves determining that an encryption key is present by accessing the security controller 300 as shown in FIG. 5. Step 740 involves performing an encryption operation on the data packets. As an example, the data packets may be encrypted, such as by crypto engine 36, using Suite B cryptographic algorithms. If the data packets were determined to be data at rest in step 710, method 700 proceeds to step 750, which involves storing the data packets in a memory device 150. If the data packets were determined to be data in transit in step 710, method 700 proceeds to step 760, which involves encapsulating information into a frame of the data packets to indicate that the data packets are data in transit. As an example, the encapsulation may be performed by the packet builder process, step 670 as described with reference to FIG. 8. Following step 760, step 770 involves transmitting the data packets, such as via network interface 210, over the communication network to a second device 40.

In some embodiments, the data packets are received from the first device 20 at a first network processing device 32. In such embodiments, prior to the step of transmitting data in transit data packets over the communications network, the data packets are sent from the first network processing device 32 through a secure tunnel on a second network processing device 38. The second network processing device 38 then transmits the data packets over the communications network. In some embodiments, the first network processing device 32 is a plain-text network processor and the second network processing device 38 is a cipher-text network processor.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the System and Method for Encryption of Network Data are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A method comprising the steps of:
providing a security device comprising a security controller connected to both a first network processing device and a second network processing device;
using the first network processing device to determine that one or more data packets received at the first network processing device from a first device on a communications network are one of data to be stored and data to be transmitted based upon a value of at least one data field of the data packets;
using the security controller to perform one of an encryption operation and a decryption operation on the data packets;
using the first network processing device to store the data packets in a memory device within the security device if they are data to be stored; and
using the second network processing device to transmit the data packets over the communications network to a second device on the communications network if they are data to be transmitted.

2. The method of claim 1, wherein an encryption operation is performed, the method further comprising the step of compressing the data packets using the first network processing device prior to the encryption operation.

3. The method of claim 1, wherein the data packets are internet protocol (IP) packets, wherein the at least one data field comprises a differentiated services (DS) field in an IP header.

4. The method of claim 3, wherein the value of the data field is the DS code point value.

5. The method of claim 1 further comprising the step of, prior to the step of using the security controller to perform one of an encryption operation and a decryption operation on the data packets, using the security controller to determine that an encryption key is present.

6. The method of claim 1, wherein the data packets are data to be transmitted, the method further comprising the step of, prior to the step of using the second network processing device to transmit the data packets over the communications network, encapsulating information into a frame of the data packets to indicate that the data packets are data to be transmitted.

7. The method of claim 1, wherein prior to the step of using the second network processing device to transmit the data packets over the communications network if they are data to be transmitted, the data packets are sent from the first network processing device through a secure tunnel on the second network processing device, wherein the second network processing device transmits the data packets over the communications network.

8. The method of claim 7, wherein the first network processing device is a plain-text network processor and the second network processing device is a cipher-text network processor.

9. A method comprising the steps of:
providing a security device comprising a security controller connected to both a first network processing device and a second network processing device;
using the first network processing device to determine that one or more data packets received at the first network processing device from a first device on a communications network are one of data to be stored and data to be transmitted based upon a value of at least one data field of the data packets;
compressing the data packets using the first network processing device;
using the security controller to determine that an encryption key is present and to perform an encryption operation on the data packets;
using the first network processing device to store the data packets in a memory device within the security device if they are data to be stored; and
using the second network processing device to transmit the data packets over the communications network to a second device on the communications network if they are data to be transmitted.

10. The method of claim 9, wherein the data packets are internet protocol (IP) packets, wherein the at least one data field comprises a differentiated services (DS) field in an IP header, wherein the value of the data field is the DS code point value.

11. The method of claim 9, wherein the data packets are data to be transmitted, the method further comprising the step of, prior to the step of using the second network processing device to transmit the data packets over the communications network, encapsulating information into a frame of the data packets to indicate that the data packets are data to be transmitted.

12. The method of claim 9, wherein prior to the step of using the second network processing device to transmit the data packets over the communications network to a second device on the communications network if they are data to be transmitted, the data packets are sent from the first network processing device through a secure tunnel on the second network processing device, wherein the second network processing device transmits the data packets over the communications network.

13. The method of claim 12, wherein the first network processing device is a plain-text network processor and the second network processing device is a cipher-text network processor.

14. A system comprising:
a security controller connected to both a first network processing device and a second network processing device, the first network processing device configured to receive one or more data packets from a first device connected to a communications network and determine that the data packets are one of data to be stored and data to be transmitted based upon a value of at least one data field of the data packets, the security controller configured to perform one of an encryption operation and a decryption operation on the data packets, the first network processing device configured to store the data packets in a memory device if they are data to be stored and transmit the data to the second network processing device for transmission to a second device connected to the communications network if they are data to be transmitted.

15. The system of claim 14, wherein the first network processing device is configured to compress the data packets and the security controller is configured to determine that an encryption key is present prior to the encryption operation.

16. The system of claim 14, wherein the data packets are internet protocol (IP) packets, wherein the at least one data field comprises a differentiated services (DS) field in an IP header, wherein the value of the data field is the DS code point value.

17. The system of claim 14, wherein the first network processing device is a plain-text network processor and the second network processing device is a cipher-text network processor.

18. The system of claim 14, wherein the data packets are data to be transmitted, wherein security controller is configured to encapsulate information into a frame of the data packets to indicate that the data packets are data to be transmitted.

19. The system of claim 18, wherein the first network processing device is configured to send the data packets from the first network processing device through a secure tunnel on the second network processing device, wherein the second network processing device is configured to transmit the data packets over the communications network to the second device.

* * * * *